United States Patent [19]

Bennett et al.

[11] Patent Number: 4,612,031

[45] Date of Patent: Sep. 16, 1986

[54] METHOD AND APPARATUS FOR SHAPING GLASS SHEETS ON SHAPING MOLDS WITH FLOTATION BLOCKS

[75] Inventors: Terry A. Bennett, Monroeville; William B. Zimmerman, Pittsburgh; Michael B. Maslanka, Irwin, all of Pa.

[73] Assignee: PPG Industries, Inc., Pittsburgh, Pa.

[21] Appl. No.: 748,067

[22] Filed: Jun. 24, 1985

[51] Int. Cl.$^4$ ............................................. C03B 23/02
[52] U.S. Cl. .......................................... 65/106; 65/104; 65/273; 65/287
[58] Field of Search ................ 65/104, 106, 287, 290, 65/273

[56] References Cited

U.S. PATENT DOCUMENTS

| | | |
|---|---|---|
| 3,468,645 | 9/1969 | McMaster et al. ............... 65/104 X |
| 3,586,492 | 6/1971 | McMaster ........................ 65/104 X |
| 3,607,200 | 9/1971 | McMaster ........................ 65/106 X |
| 3,846,104 | 1/1973 | Seymour .............................. 65/104 |
| 3,869,271 | 3/1975 | Shaffer et al. ...................... 65/273 |
| 4,229,200 | 10/1980 | Seymour .............................. 65/106 |
| 4,298,368 | 11/1981 | Seymour ........................ 65/104 X |
| 4,432,782 | 2/1984 | Seymour ........................ 65/106 X |

Primary Examiner—Arthur Kellogg
Attorney, Agent, or Firm—Andrew C. Siminerio

[57] ABSTRACT

A hot glass sheet shaping apparatus for shaping glass sheets with selected portions wider than its trailing edge as it is conveyed to the shaping station. Flotation blocks are positioned adjacent a gas hearth bed support in the shaping station to support the selected portions of the glass sheet as they are conveyed thereover, to prevent these portions from contacting the gas hearth bed.

8 Claims, 6 Drawing Figures

METHOD AND APPARATUS FOR SHAPING GLASS SHEETS ON SHAPING MOLDS WITH FLOTATION BLOCKS

BACKGROUND OF THE INVENTION

1. Field of Invention

The present invention relates generally to the production of bent glass sheets and, more particularly, to shaping hot glass sheets whose leading edge, as it is conveyed into the shaping station, is wider than the trailing edge.

2a. Technical Considerations

Bent glass sheets are commonly used as glaze enclosures in vehicles such as automobiles and the like. For such applications, the glass sheets must be bent to precisely defined curvatures dictated by the configuration and outline of the vehicle openings in which the sheets are to be installed, as well as the overall styling of the vehicle. At the same time, it is important that the bent sheets meet very stringent optical requirements so that the viewing area of the resulting shaped window is free of optical defects or marks that would interfere with good vision through the window. For certain windows used as glazed enclosures, bent glass sheets are tempered to strengthen them and increase their resistance to damage resulting from impact.

Often times, based on the desires of automobile stylists, the window curvatures are complex in shape. These windows require reverse S-curves along their leading edge and deep bends in their transverse direction. The complex curvatures generally necessitate the use of a press bending apparatus rather than sag bending apparatus to effect the final desired curvature. In press bending, the glass sheets are generally supported, either on a series of rolls or by a gas hearth bed, which supports the glass in close relation thereover by hot gas. The glass is then lifted from proximity to the support plane into engagement with a vacuum holder and then deposited onto a ring-like member which is interposed between the plane of support and the bottom surface of the vacuum holder.

The complicated nature of the heating operation required to soften the glass sufficiently to be shaped by press bending to the complex curvatures, causes the leading edge of the glass to develop a higher temperature than the trailing edge of the glass. This further complicates the shaping of the glass to various complex shapes because the leading edge of the glass which develops a higher temperature during conveyance to the furnace is more likely to sag than the trailing edge of the glass which develops a lower elevated temperature. Attempts to develop a reverse curvature transverse to the general longitudinal curvature of the sheets in a portion of the sheet near the furnace exit, i.e. the trailing edge, would result in overheating and additional sag of the leading edge, as well as inefficient heating.

Still another complication arises from the fact that the windows are often trapezoidal in shape with the leading edge and/or mid portion of the glass sheet being wider than the trailing edge. Because of the higher temperature of the leading edge required to make the complicated bends and its tendency to sag and deform as soon as it is unsupported, the glass sheet must be supported along its entire width as it is transferred from the heating furnace to its position on the gas hearth in the shaping station. This supported transfer must occur despite the fact that the gas hearth bed supporting the glass when positioned at the shaping station need only be trapezoidal in shape with its upstream support width being narrower than its downstream support width. If the corners of the leading edge and the longitudinal end portions of the glass mid portions are not supported, they will sag and contact the edge of the gas hearth bed as the hot sheet is initially transferred thereon.

It would be advantageous to fully support the entire glass sheet surface of glass sheets that are wider at their leading edge or mid portion than at their trailing edge and require complicated curvatures and specialized heat patterns as the sheets are moved into position in a shaping station, so as to minimize marring of the glass.

2b. Patents of Interest

U.S. Pat. No. 3,468,645 to McMaster et al. and U.S. Pat. No. 3,607,200 to McMaster both teach the use of a recessed lifting frame disposed below the surface of a gas hearth bed in the shaping station. The frame engages the periphery of a float glass sheet and lifts it off a flat gas hearth bed and into engagement with the shaping surface of an upper shaping mold so that the glass is curved in conformity with the upper mold. After shaping, the frame lowers the shaped sheet away from the mold and moves it into a cooling area. The frame in U.S. Pat. No. 3,607,200 includes a second portion that simultaneously removes a shaped glass sheet from the cooling section as the next shaped glass sheet enters. In both patents, the shape of the glass sheets and the final designed curvatures are relatively simple.

U.S. Pat. No. 3,846,104 to Seymour teaches the shaping of glass sheets to a non-uniform shape by positioning heat softened glass sheets over a gas hearth bed at a shaping station beneath an upper vacuum mold. The hot glass sheet exits the furnace and is transferred from the furnace gas hearth to the shaping station gas hearth without any intermediate support. A lower outline pressing mold of complimentary shape surrounds the gas hearth bed and is located below the upper vacuum mold. The lower outline pressing mold moves between a retracted position below the upper surface of the gas hearth bed and an upper position near the upper vacuum mold. The lower outline pressing mold raises to engage the glass sheet against the upper vacuum mold to cause the heat softened glass to develop a shape conforming to that of the vacuum mold. Suction pulled through the upper vacuum mold holds the shaped glass sheet against its lower shaping surface while the lower outline pressing mold retracts to enable a ring-like member having an outline shaping surface that conforms to the supported portion of the glass sheet adjacent its parimeter to shuttle into position below the vacuum mold. The vacuum pulled through the vacuum mold is ended and the shaped glass sheet falls onto the ring-like member for transfer to a cooling station where the glass is cooled sufficiently rapidly to develop a desired degree of temper.

U.S. Pat. No. 3,869,271 to Shaffer et al. teaches the mechanical support of a hot glass sheet as it is transferred from a first gas hearth bed in a furnace section to a second gas hearth bed in a shaping station. A series of snub rolls are positioned between the gas hearth beds along the conveyed path of the longitudinal end portions of the hot glass sheets. The upper surfaces of the rolls are aligned with the upper surface of the gas hearth beds so as to support the longitudinal end portions of the glass sheet as the sheet is conveyed from the first bed to the second bed.

U.S. Pat. No. 4,229,200 to Seymour teaches a drop forming arrangement wherein flat glass sheets are positioned on a flat gas hearth bed and lifted by means of a flat vacuum platen that contacts the upper surface of the glass sheet. A shaping ring is conveyed beneath the elevated glass and the vacuum in the platen is released allowing the glass to fall on the ring. Auxiliary shaping means are positioned around and below the upper surface of the gas hearth bed. After the sheet is lifted, the auxiliary shaping means extend above the gas hearth bed and prebend the sheet prior to dropping it on the shaping ring. If required, the auxiliary shaping means can be used to lift the glass sheet into engagement with the upper vacuum platen.

U.S. Pat. No. 4,432,782 to Seymour teaches the support of a flat glass sheet as it exits a furnace section by combination of a gas hearth bed and replaceable flat plate portions. The plate portions are slotted for movement of a lifting ring that is initially positioned below the plate and thereafter moves therethrough. As the hot glass sheet exits the furnace, the main portion of the sheet is supported by the gas hearth bed while the longitudinal end portions slide over the replaceable flat plate portions. To prevent marring of the longitudinal end portions of the hot glass that sags onto and contacts the plate portions, the plate portions are covered with a material such as boron nitride.

SUMMARY OF THE INVENTION

The present invention provides a hot glass sheet shaping apparatus that includes an upper mold, a lower gas hearth bed positioned below said upper mold to support said glass sheet to be shaped on a layer of pressurized hot gas, and a vertically reciprocating outline mold surrounding the gas hearth bed. The configuration of the glass sheets that are shaped are such that selected portions of the hot glass sheet to be shaped are wider than a trailing edge portion of the glass sheet as it is conveyed.

Flotation blocks are positioned adjacent to and spaced from the gas hearth bed to provide a space to receive portions of the outline mold therebetween. The blocks are positioned relative to the gas hearth bed to support the selected portions of the glass sheet as it is conveyed to and positioned over the gas hearth bed to prevent the sheet from contacting the bed. The flotation blocks can be integral with or separate from said gas hearth beds. In the preferred embodiment the blocks and the gas hearth bed maintain equal support pressures over their supporting surfaces.

The present invention also provides a gas hearth support for supporting a hot glass sheet to be shaped on a layer of hot gas, in a position to be lifted by a ring-like lifting member having a plan outline and curved elevational shape conforming to that desired of the glass sheet to be shaped. The gas hearth support includes a main bed having a plan outline conforming to an outline inboard of the glass sheet perimeter to support a major surface of the glass thereabove prior to the sheet being engaged by the lifting member which surrounds the perimeter of main body. Flotation blocks which located adjacent to the main bed such that portions of the lifting member which surround the main bed are positioned therebetween for reciprocating movement above and below a support surface defined by the main body. The flotation blocks support portions of the glass sheets that are wider than the trailing edge of the glass sheet as it is positioned over the main body.

DESCRIPTION OF PREFERRED EMBODIMENT

Figure 1:
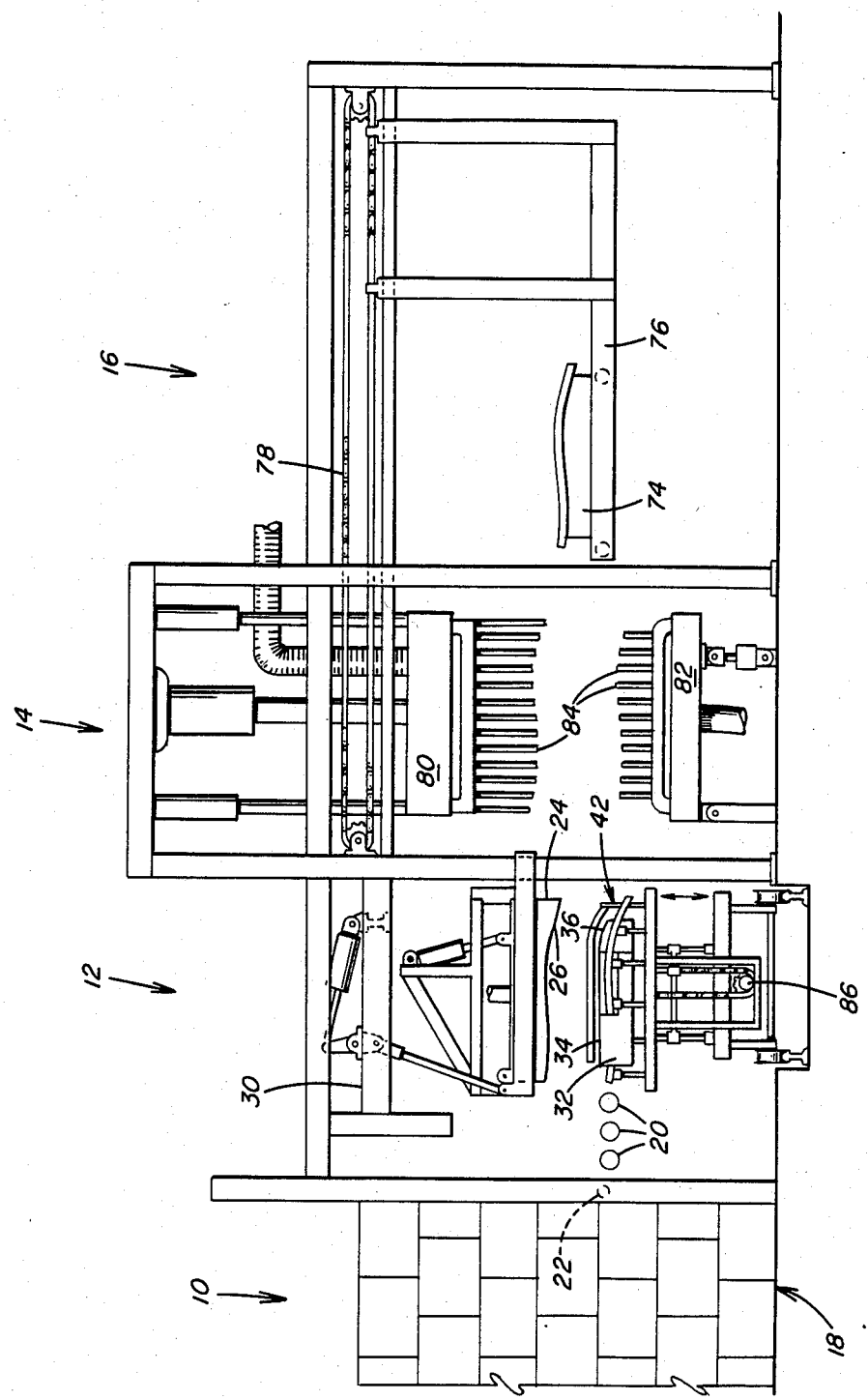
FIG. 1 is a longitudinal side view of a glass sheet bending and tempering apparatus, incorporating the features of the present invention.

Referring to the drawings, and particularly FIG. 1, a typical apparatus comprises a heating area 10, a shaping station 12, a cooling station 14 and unloading station 16 shown in an end-to-end relation. Glass sheets are generally conveyed along a path through the length of the heating area 10 and arrive at the shaping station 12 where they are shaped to the desired configuration and then transported to the cooling station 14. After sufficient exposure to cold blasts at the cooling station 14, the bent and cooled glass sheet to which the desired degree of temper has been imparted to are transferred to the unloading station 16 and removed. The operation of a typical heating, shaping, cooling and unloading apparatus is taught in allowed U.S. Pat. No. 4,508,556 Bennett et al. which teachings are herein incorporated by reference.

In general, the heating area 10 comprises a tunnel-type furnace 18 of the gas hearth or roller hearth type. The temperature along the furnace length is controlled by computers. It is understood that these types of controlled heating systems are well known in the art and are, by way of example, and is not limiting to the present invention.

Glass sheets G are serially heated and conveyed through the furnace 18 and transferred onto a plurality of silica transfer rolls 20, covered by fiberglass sleeves located immediately beyond the exit of the furnace 18. The transfer rolls 20 bridge the gap between the exit of the furnace 18 and shaping station 12.

A glass sensing mechanism 22 determines the location of the glass sheet and initiates operation of a programmable computer (not shown) that determines the sequence of operating various actuating means to be discussed hereinafter so as to ensure that the apparatus operates in proper synchronism. While the glass sensing mechanism is shown at the exit end of the furnace 18 for illustration, it is understood that such a device may be located anywhere along the glass movement path that is convenient.

The shaping station 12 comprises an upper vacuum mold 24 having a downward facing surface that is curved both longitudinally and transverse to the path of travel defined by transfer rolls 20. The downstream end of the downwardly facing shaping surface of the upper vacuum mold 24 has a downwardly curved end portion 26 of substantially S-shaped configuration. The upper vacuum mold 24 has a vacuum chamber whose downward facing wall is apertured and is covered by fiberglass cloth cover (not shown) and communicates with a source of vacuum through a flexible vacuum pipe 28. The upper vacuum mold 24 is supported on an adjustable support frame 30.

Figure 2:
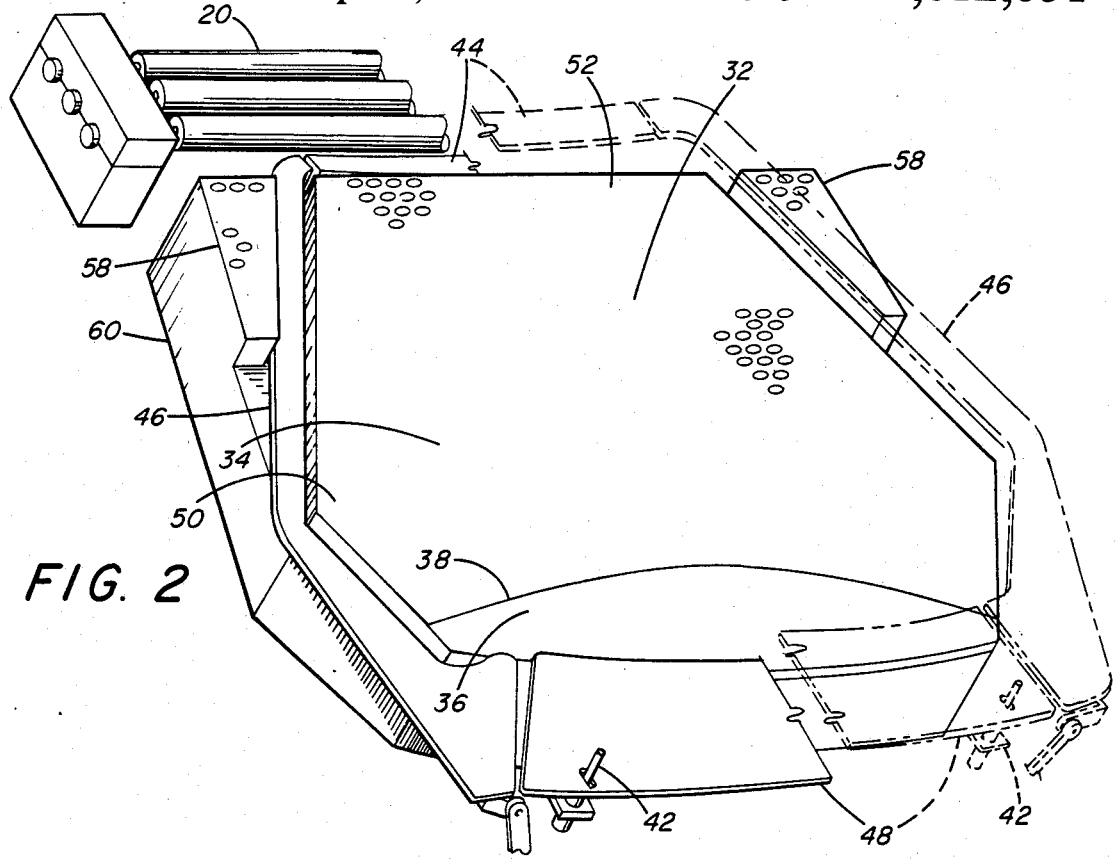
FIG. 2 is a perspective view of a portion of the shaping station of FIG. 1 illustrating the auxiliary flotation blocks of the present invention and showing the gas hearth bed with the shaping rail in a recessed position below the upper surface of the gas hearth bed (solid lines) and in a raised position above the surface of the gas hearth bed, (phantom lines) with portions removed for clarity.

Gas hearth bed as taught in this invention, is disposed below the downwardly facing shaping surface of the upper vacuum mold 24. As shown in FIG. 2, the gas hearth bed 32 has a substantially flat upper portion 34 with a downwardly curved downstream end portion 36 that extends downward from a transversely curved boundary 38. Downwardly curved downstream end portion 36 blends downwardly away from the flat upstream portion surface 34 of the bed 32.

With continued reference to FIG. 2, an articulating lower shaping mold 40 surrounds a portion of the gas hearth bed 32 that supports the glass sheets G to be shaped after it has exited the furnace 18 and the glass sheet is positioned over the gas hearth bed 32 by glass positioning assembly 42 located at the downstream portion of the shaping mold 40. It is understood that the articulating shaping mold 40 described herein is used for illustration only. Other shaping mold configurations can be used with the support bed of the present invention. The lower shaping mold 40 comprises a first shaping rail portion 44 which is positioned between the transfer rolls 20 and the upstream end of the gas hearth bed 32. It has an upper surface extending transversely to the path of movement defined by the conveying surface of the furnace 18 and the transfer rolls 20. Articulating side rail portions 46 extend on the side of the gas hearth 32 longitudinally of the path. Rail portions 46 are interconnected by second rail portion 48 at the downstream end portion 26 of the lower shaping mold 40. The second rail portion 48 has an upper surface that blends with the shape of the downwardly curved downstream end portion 36 of the gas hearth bed 32. As illustrated in FIG. 2, as the shaping mold 40 moves from a first position below the support surfaces of the gas hearth bed 32 to a second position above the support surface, a mold articulating means (not shown) pivots rail portions 44, 46 and 48 so that their upper faces form a continuous shaping surface. Each of the rail portions 44, 46 and 48 are covered by continuous heat resistant material such as a material made by Carborundum and sold under the trademark FIBERFRAX TM 970J paper.

Figure 4:
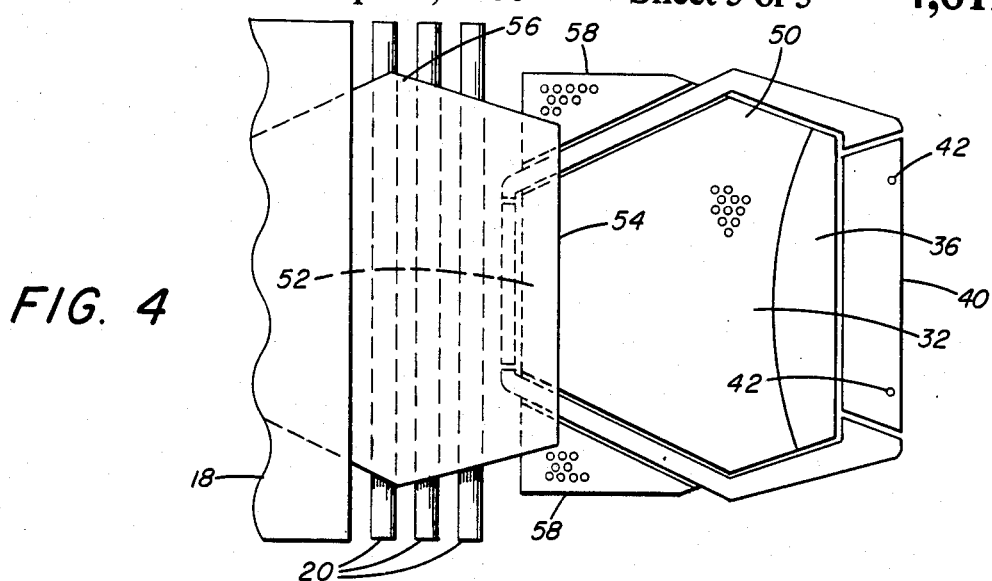
FIGS. 4, 5 and 6 are a plan view of the furnace transfer rolls and gas hearth bed illustrating how the auxiliary flotation blocks support the heat softened glass sheet as it exits the furnace and is positioned in the shaping station.
Figure 5:
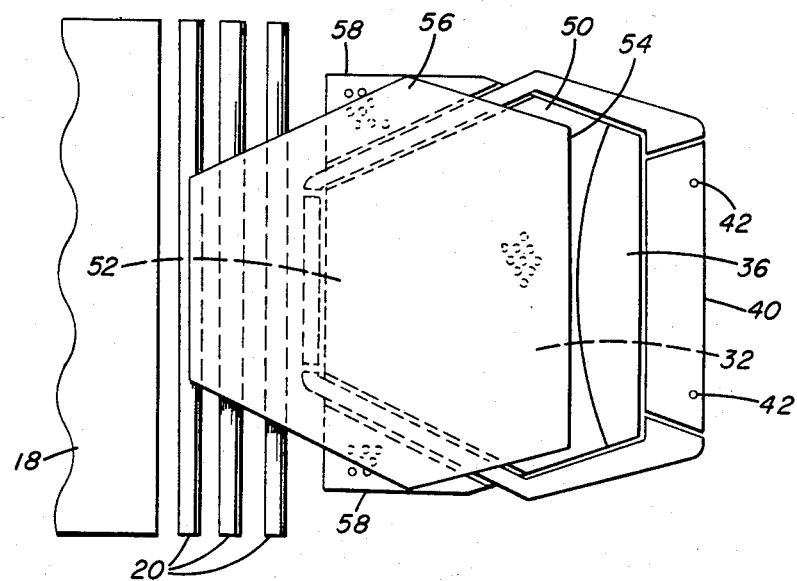
Figure 6:
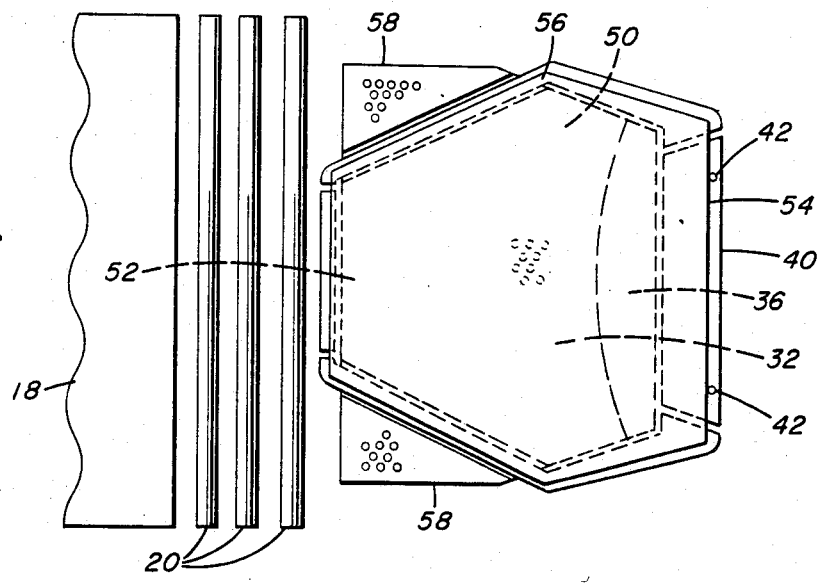

With continued attention to FIG. 2, the gas hearth bed 32 is wider at its downstream end portion 26 and mid section 50 than at its upstream area 52 immediately downstream from rolls 20, due to the flat configuration of the glass sheet G which it supports. The heating pattern required to make a complex curve in the leading edge of the glass sheet G causes leading edge 54 to be hotter than the rest of the glass, so that the leading edge 54 is more susceptible to complicated forming. Since the leading edge 54 and mid portion 56 of the glass sheet to be shaped is wider than the upstream area 52 of the gas hearth bed 32, auxiliary flotation blocks 58, which are the subject of this invention, are positioned adjacent the upstream area 47 and outboard of the lower shaping mold 40. As illustrated in FIGS. 4, 5, and 6, the glass sheet G exits the furnace 18 and is conveyed over transfer rolls 20 towards the gas hearth bed 32 and the shaping station 12. As the leading edge 54 and mid portion 56 of the heat softened glass sheet G move onto the gas hearth bed 32, the auxiliary flotation blocks 58 provides sufficient lifting force to prevent these portions from sagging and contacting the blocks 58 or any other portion of the shaping mold 40. As a result, the glass sheet G is conveyed into the shaping station and positioned on the gas hearth bed 32 with a minimum of marring due to contacting of support surfaces.

Figure 3:
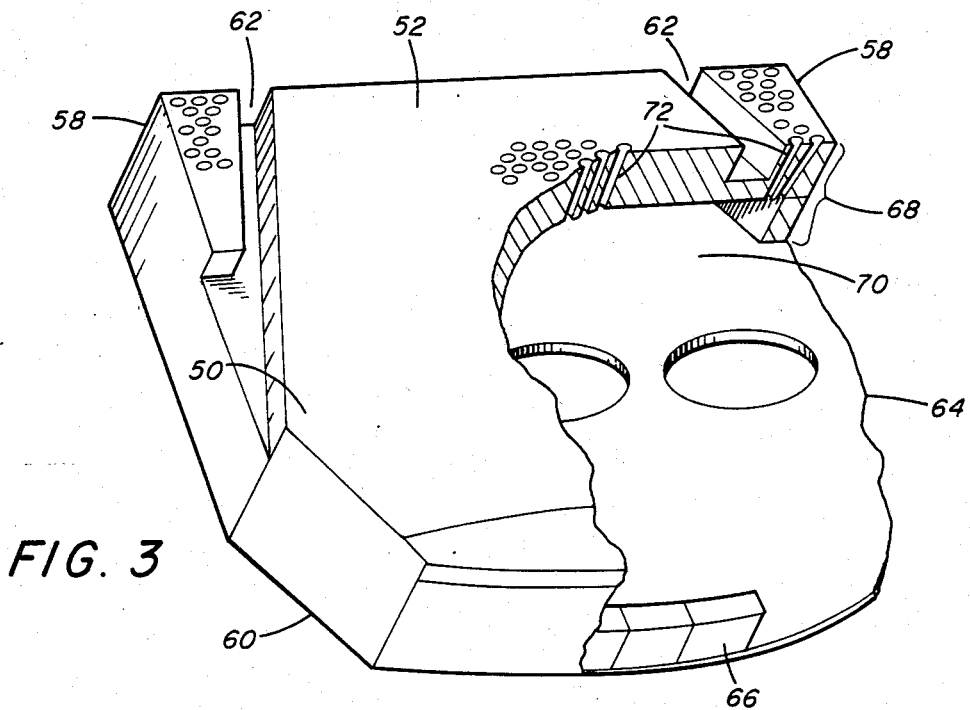
FIG. 3 is a perspective, cutaway view similar to the gas hearth bed shown in FIG. 2 shown without the shaping rail with portions removed for clarity.

Although block 58 can be separate units from the gas hearth bed 32 with individually controlled gas pressure regulators to regulate the gas flow through the blocks 58 and surface pressure at the block surface, in the preferred embodiment the gas hearth bed 32 and blocks 58 are all formed from a single monolithic ceramic block 60 as illustrated in FIG. 3. The block 60 includes the gas hearth bed 32 and the blocks 58 which are separated by a groove 62. Side rail portions 46 of the shaping mold 40 fit within the groove 62 when the shaping mold 40 is in a recessed first position so that the upper surface of the rail portion 46 is below the surface 34 of the gas hearth bed 32. The ceramic block 60 is mounted over an apertured plate 64 on a ring of heat resistant brick 66. The external seam between the block 60 and the brick 66 is sealed with a layer 68 of insulating cement forming a plenum 70 between the block 60 and plate 64. The plenum 70 is pressurized with hot gas that is heated in a chamber (not shown) beneath the apertured plate 64. The pressurized hot gas escapes through a plurality of orifices 72 that extend from the plenum 70 through the block 60 to the surfaces of portions 34 and 36. In the preferred embodiment, the orifices in the flotation block 58 also extend from the plenum 70. This arrangement makes it easier to regulate the gas pressure over the surface of the entire block 60 and keep it uniform.

As stated earlier, the blocks 58 can be independent of the gas hearth bed 32. This would require individual adjustment of the pressure in the plenum 70 and a corresponding plenum in the separate blocks 58 to maintain a uniform pressure across the entire glass sheet supporting surface.

Referring back to FIG. 1, the apparatus also includes a ring-like member 74 supported in cantilever relation from a shuttle carriage 76. A drive 78 moves the carriage 76 and its supported ring-like member 74 between a loading station 16 and a position intermediate the upper vacuum mold 24 and the gas hearth bed 32 when the lower shaping mold is retracted downwardly and then to a position in the cooling station 14.

The cooling station 14 comprises an upper cooling plenum 80 and a lower cooling plenum 82 which are supplied with pressurized air to cool the hot glass sheet. The length of cooling nozzles 84 which extend from the cooling plenums 80 and 82 are such as to provide a shape conforming to the shape of the bent glass sheet.

The operation of the heating, shaping, cooling, and unloading apparatus involves mounting a series of spaced glass sheets at the entrance of the tunnel-like furnace 18 and moving the glass sheets through the furnace 18 at a rate such that the leading edge 54 of the glass develops a higher temperature than the trailing edge of the glass, and the lowest temperature of the glass is at least at the deformation temperature of the glass which is in the range of 1200° F. to 1220° F. (650° C. to 660° C.). Typically, the leading edge 54 is heated to a temperature between 1225° F. to 1250° F. (663° C. to 677° C.) when being formed into a complex curve. The leading glass sheet in the series, when it reaches a position at which it is detected by the glass sensing mechanism 22, actuates a programmable controller (not shown) and is immediately conveyed over the transfer rolls 20 and above the gas hearth bed 32 where it is positioned by stops 42, while the auxiliary float blocks 58 provide additional support to the leading edge 54 and mid portion 56 of the glass sheet G as it moves into position. The leading edge of the glass sheet is sufficiently hot to conform to the downwardly curved shape of the downstream portion 36 of the gas hearth bed 32.

At the proper time, depending upon the speed of rotation of the transfer rolls 20 which deliver the glass sheet at a higher speed than the conveying speed within the furnace, an elevator means 86 is actuated to lift the lower shaping mold 40. Rail portions 44, 46 and 48 of the shaping mold 40 pivot into position and engage a perimeter portion of the glass sheet lifted off the gas hearth bed 32 and force it up against the downwardly facing shaping surface of the upper vacuum mold 24 to develop the shape required.

A vacuum is applied to the upper vacuum mold 24 to engage the glass sheet G by vacuum, and to ensure that the glass sheet G conforms more closely to the shape of the upper mold 24. The lower mold 40 is then lowered to the retracted position below the surfaces 34 and 36 of the gas hearth bed 32 with the rails 46 fitting within grooves 62 in block 60, and the ring-like member 74 is transferred into a position below the upper vacuum mold. After the ring-like member 74 arrives in position beneath the upper vacuum mold 24, the glass sheet G is released by releasing the vacuum. The glass sheet then drops onto the upper surface of the ring-like member 74 which supports it for movement to the cooling station 14. When sufficient cooling has taken place, the shuttle carriage 76 moves the ring-like member 74 into the unloading station 16 where the glass sheet is removed from the ring-like member 74 and the latter is returned into a parking position at the cooling station 14 to await the disposition of the next glass sheet.

The form of this invention shown and described in this disclosure represents an illustrative preferred embodiment. It is understood that various other changes may be made without departing from the gist of the invention as defined in the claimed subject matter which follows.

We claim:

1. An improved apparatus for shaping a hot glass sheet including a furnace, a shaping station having an upper mold, a lower gas hearth bed positioned below said upper mold to support said glass sheet to be shaped on a layer of pressurized hot gas, and a vertically reciprocating outline mold surrounding said gas hearth bed wherein selected side portions of said hot glass sheet to be shaped are wider than a trailing portion of said glass sheet, such that as said glass sheet is conveyed from said furnace, over a series of transfer rolls and into said shaping station, said selected side portions subsequently overhang selected portions of said outline mold wherein the improvement comprises:

gas hearth flotation blocks positioned external of said selected portions of said outline mold in positions to support said selected overhanging side portions of said glass sheet as it is conveyed to and positioned over said gas hearth bed.

2. The apparatus as in claim 1 wherein said flotation blocks are integral with said gas hearth bed and further wherein said gas hearth bed and said flotation blocks maintain equal support pressure over their supporting surfaces.

3. The apparatus as in claim 1 wherein said flotation blocks are separate from said gas hearth bed and further including pressure regulation means to maintain equal support pressures over said flotation blocks and said gas hearth bed.

4. A gas hearth support for supporting a hot glass sheet to be shaped on a layer of hot gas, in a position to be lifted by a ring-like lifting member having a plan outline and curved elevational shape conforming to that desired of said glass sheet to be shaped, wherein selected side portions of said hot glass sheet are wider than a trailing portion of said glass sheet such that said selected side portions substantially overhang portions of said lifting member as said glass sheet to be shaped is conveyed from a furnace, over a series of transfer rolls and onto said gas hearth support, said gas hearth support comprising:

a main gas hearth bed having a plane outline conforming to an outline inboard of the glass sheet perimeter to support a major surface of said glass sheet thereabove prior to said sheet being engaged by said lifting member which surrounds the perimeter of said main bed; and gas hearth flotation blocks located external of said portions of said lifting member wherein said lifting member surrounds said main bed and is positioned for reciprocating movement above and below a support surface defined by said main bed and flotation blocks, said flotation blocks supporting said overhanging side portions of said glass sheet as said sheet is positioned over said main bed.

5. The gas hearth support as in claim 4 wherein said blocks are integral with said bed and further wherein a common hot pressurized gas source supplies gas to both said blocks and said bed.

6. The gas hearth support as in claim 4 wherein said blocks include a hot pressurized gas source separate from said bed pressurized gas source, and further including means to maintain equal support pressures over said blocks and said bed.

7. An improved method of shaping glass sheets having selected side portions wider than a trailing portion of said glass sheet to be shaped, including the steps of heating said glass sheet to its heat deformation temperature, conveying said heated glass sheet to a shaping station, adjusting the speed of said conveying step for accelerated transfer of said glass sheet to said shaping station, positioning said glass sheet on a support bed, and lifting said glass sheet with a lifting member into engagement with an upper mold, wherein selected side portions substantially overhang said lifting member as said glass sheet is conveyed over said sheet support bed, the improvement comprising:

supporting said overhanging side portions of said glass sheet during said conveying step by flotation blocks so as to prevent said glass sheet from contacting said sheet support bed prior to said lifting step.

8. The method as in claim 7 wherein said sheet support bed is a first gas hearth bed, and said flotation blocks are a second gas hearth bed, said glass sheet being supported above both said first and second gas hearth beds by pressurized sheet support gas further including the step of maintaining equal sheet support gas pressure at said first and second gas hearth beds.

* * * * *